(12) United States Patent
Ho

(10) Patent No.: US 10,112,548 B2
(45) Date of Patent: Oct. 30, 2018

(54) ROLL-ON TWO-WHEELED CYCLE CARRIER

(71) Applicant: Devin Ho, Irvine, CA (US)

(72) Inventor: Devin Ho, Irvine, CA (US)

(*) Notice: Subject to any disclaimer, the term of this patent is extended or adjusted under 35 U.S.C. 154(b) by 10 days.

(21) Appl. No.: 15/376,520

(22) Filed: Dec. 12, 2016

(65) Prior Publication Data

US 2018/0162289 A1 Jun. 14, 2018

(51) Int. Cl.
*B60R 9/10* (2006.01)
*B62H 3/08* (2006.01)
*B60R 9/042* (2006.01)
*B60R 9/06* (2006.01)

(52) U.S. Cl.
CPC .............. *B60R 9/10* (2013.01); *B60R 9/0426* (2013.01); *B60R 9/06* (2013.01); *B62H 3/08* (2013.01); *Y10S 224/924* (2013.01)

(58) Field of Classification Search
CPC .......... B60R 9/10; Y10S 224/924; B62H 3/08
USPC .................... 224/924; D12/407, 408; 410/3; 414/462, 228, 229
See application file for complete search history.

(56) References Cited

U.S. PATENT DOCUMENTS

| | | | | |
|---|---|---|---|---|
| 3,603,459 A | | 9/1971 | Erb | |
| 3,720,333 A | * | 3/1973 | Vaughn | B60R 9/06 224/402 |
| 3,843,001 A | * | 10/1974 | Willis | B60P 3/122 224/402 |
| 4,189,274 A | | 2/1980 | Shaffer | |
| 4,275,981 A | * | 6/1981 | Bruhn | B60R 9/10 224/402 |
| 4,431,205 A | * | 2/1984 | Speicher | B60R 9/06 224/497 |
| 4,815,638 A | * | 3/1989 | Hutyra | B60R 9/10 224/516 |
| 4,934,894 A | * | 6/1990 | White | A61G 3/0209 224/492 |
| 6,089,430 A | * | 7/2000 | Mehls | B60R 9/06 224/506 |
| 6,739,823 B2 | * | 5/2004 | Shirvell | B60P 3/07 414/462 |
| 6,761,297 B1 | * | 7/2004 | Pedrini | B60R 9/10 224/324 |

(Continued)

*Primary Examiner* — Justin Larson
(74) *Attorney, Agent, or Firm* — Knobbe, Martens, Olson & Bear, LLP

(57) ABSTRACT

An apparatus for loading, transporting, and unloading a two-wheeled cycle includes an elongate rail configured to support a two-wheeled cycle. A loading ramp is connected to the proximal end of the rail and is selectively deployable to substantially ground level, thereby permitting a user to roll a two-wheel cycle up the loading ramp and onto the rail. The apparatus comprises an upper initial engagement mechanism and a lower initial engagement mechanism configured removably to attach to the wheels of the two-wheeled cycle. The upper initial engagement mechanism and the lower initial engagement mechanism provide sufficient stability to permit a user to remove his or her hands from the two-wheeled cycle without the two-wheeled cycle falling off the apparatus. The apparatus comprises a final engagement mechanism configured to secure the two-wheeled cycle safely to the apparatus during transportation.

16 Claims, 5 Drawing Sheets

(56) References Cited

U.S. PATENT DOCUMENTS

| | | | | |
|---|---|---|---|---|
| 6,769,583 B1* | 8/2004 | Gordon | ................... | B60R 9/06 |
| | | | | 224/402 |
| 6,783,041 B2* | 8/2004 | Ford | ................... | B60R 9/10 |
| | | | | 224/310 |
| 7,222,763 B2* | 5/2007 | Pedrini | ................... | B60R 9/10 |
| | | | | 224/324 |
| 7,472,517 B2* | 1/2009 | Blume | ................... | B62H 3/00 |
| | | | | 211/20 |
| 7,694,830 B1* | 4/2010 | Larson | ................... | B62H 3/08 |
| | | | | 211/20 |
| 8,104,588 B2* | 1/2012 | Curlee | ................... | B62H 3/08 |
| | | | | 188/32 |
| 8,235,267 B2* | 8/2012 | Sautter | ................... | B60R 9/10 |
| | | | | 224/497 |
| 8,783,536 B1 | 7/2014 | Julian | | |
| 2004/0238582 A1* | 12/2004 | Pedrini | ................... | B60R 9/10 |
| | | | | 224/519 |
| 2005/0061842 A1* | 3/2005 | Tsai | ................... | B60R 9/06 |
| | | | | 224/501 |
| 2011/0233154 A1* | 9/2011 | St. Louis | ................ | B62H 3/08 |
| | | | | 211/13.1 |
| 2013/0270201 A1 | 10/2013 | Vineyard | | |
| 2016/0046242 A1* | 2/2016 | Peck | ................... | B60R 9/10 |
| | | | | 224/327 |
| 2017/0190369 A1* | 7/2017 | Rayl | ................... | B62H 3/08 |

\* cited by examiner

ROLL-ON TWO-WHEELED CYCLE CARRIER

BACKGROUND

Technical Field

This disclosure relates to a carrier for two-wheeled cycles configured to attach to a motor vehicle.

Description of Related Art

Two-wheeled cycles (such as, for example, bicycles, motorcycles, and mopeds) can be towed to a riding location using a carrier mounted on a motor vehicle. Various devices for loading, unloading, and transporting two-wheeled cycles on motor vehicles have been designed, but existing carriers suffer from various drawbacks.

SUMMARY

Embodiments described herein have several features, no single one of which is solely responsible for their desirable attributes. Without limiting the scope of the invention as expressed by the claims, some of the advantageous features will now be briefly discussed.

In some embodiments, an apparatus for loading, transporting, and unloading one or more two-wheeled cycles includes an elongate rail configured to support a two-wheeled cycle. An elongate loading ramp is connected to the rail. The rail includes a proximal end or proximal end portion configured to connect to the loading ramp and a distal end or distal end portion opposite the proximal end portion. The loading ramp includes a rail end configured to connect to the rail and a distal end opposite the rail end. The length of the loading ramp is at least sufficient for the distal end to reach substantially to ground level so as to permit a user to roll a two-wheeled cycle up the loading ramp. An upper initial engagement mechanism and a lower initial engagement mechanism are attached to the rail. The lower initial engagement mechanism is attached toward the proximal end of the rail, and the upper initial engagement mechanism is attached toward the distal end of the rail.

After rolling a two-wheeled cycle to the appropriate location on the rail, the upper engagement mechanism secures a first wheel of the two-wheeled cycle, and the lower engagement mechanism secures a second wheel of the two-wheeled cycle. The upper and lower initial engagement mechanisms secure the two-wheeled cycle sufficiently that the user can take his or her hands off of the two-wheeled cycle without the two-wheeled cycle falling off of the apparatus. The apparatus also includes a final engagement mechanism which is capable of securing the two-wheeled cycle sufficiently to enable the two-wheeled cycle safely to be transported using a motor vehicle. In some embodiments, the two-wheeled cycle carrier is of modular design, allowing a user to selectively interchange parts of the two-wheeled cycle carrier depending on the user's needs.

Additional embodiments provide a method of using a two-wheeled cycle carrier to load, transport, and unload one or more two-wheeled cycles. The method includes securing a roll-on two-wheeled cycle carrier to a motor vehicle or trailer. The two-wheeled cycle carrier includes a rail that is connected to a loading ramp which has attached both an upper initial engagement mechanism and a lower initial engagement mechanisms. The method further includes providing a two-wheeled cycle at a first location, rolling the two-wheeled cycle up the loading ramp and onto the rail, and engaging both the upper initial engagement mechanism and the lower initial engagement mechanism to arrest the wheels of the two-wheeled cycle, keeping the two-wheeled cycle stationary and permitting the user to take his or her hands off of the two-wheeled cycle. The method further includes securing the two-wheeled cycle with a final engagement mechanism, which final engagement mechanism secures the two-wheeled cycle sufficiently for transportation.

In some embodiments, the method further includes using such a two-wheeled cycle carrier to transport one or more two-wheeled cycles to a second location. The method further includes unloading one or more two-wheeled cycles from the two-wheeled cycle carrier.

DETAILED DESCRIPTION OF PREFERRED EMBODIMENTS

Figure 1:
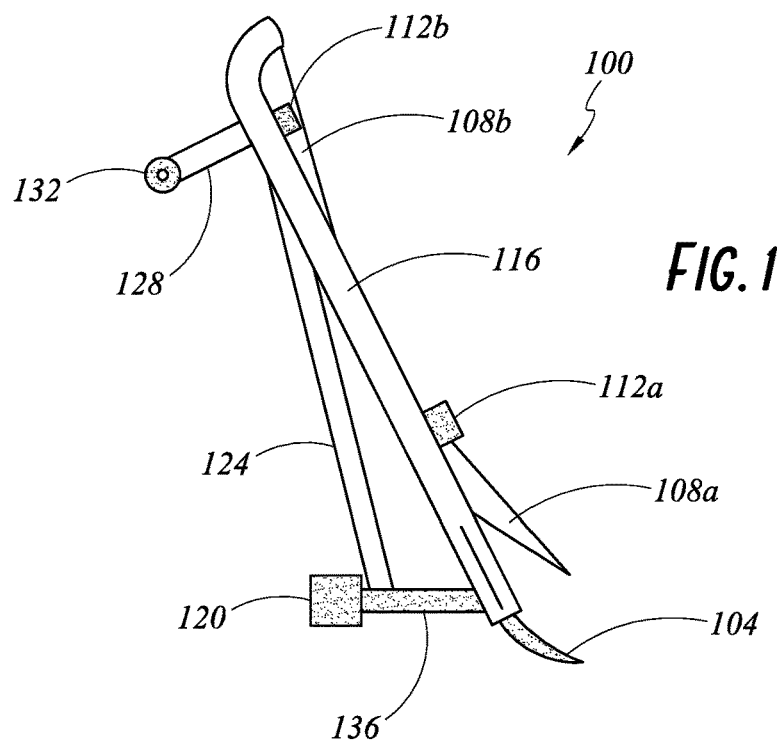
FIG. 1 depicts a side view of one embodiment of a two-wheeled cycle carrier.

Although certain preferred embodiments and examples are disclosed herein, inventive subject matter extends beyond the specifically disclosed embodiments to other alternative embodiments and/or uses of the inventions, and to modifications and equivalents thereof. Thus, the scope of the inventions herein disclosed is not limited by any of the particular embodiments described below. For example, in any method or process disclosed herein, the acts or operations of the method or process may be performed in any suitable sequence and are not necessarily limited to any particular disclosed sequence.

For purposes of contrasting various embodiments with the prior art, certain aspects and advantages of these embodiments are described. Not necessarily all such aspects or advantages are achieved by a particular embodiment. Thus, for example, various embodiments may be carried out in a manner that achieves or optimizes one advantage or group of advantages as taught herein without necessarily achieving other aspects or advantages as may also be taught or suggested herein. While some of the embodiments are discussed in the context of particular varieties or designs of two-wheeled cycles, it is understood that the inventions may be used with other types of two-wheeled cycles.

As interest has increased in using various kinds of motorized and/or non-motorized two-wheeled cycles such as bicycles, motorcycles, dirt bikes, mopeds, and scooters, enthusiasts of these types of two-wheeled vehicles have sought a simple way to load, unload, and/or transport their two-wheeled cycles using a motor vehicle or trailer. Traditional two-wheel cycle carriers typically require a user to lift their two-wheeled cycle(s) into position on the carrier, a step that can be very difficult for some users. Moreover, some two-wheeled cycles, including motorcycles, may be extremely heavy and difficult to lift even for strong and able-bodied individuals. However, even lightweight two-wheel cycles can be difficult to lift for people with limited physical abilities.

In some embodiments, a two-wheeled cycle carrier is configured to rest on or attach to the tow hitch of a motor vehicle. The two-wheeled cycle carrier can include a loading ramp that extends substantially to ground level and which permits the user to roll a two-wheeled cycle up the loading ramp without having to lift the cycle off of the ground. The loading ramp connects to a rail which may include a track configured to prevent the wheels of the two-wheeled cycle from falling out of the carrier. In some embodiments, the rail is supported by a rail connector which extends outwardly from the motor vehicle. In some embodiments the rail connecter is configured to attach directly to a trailer hitch or towing ball at the rear of a motor vehicle. In still other embodiments, the rail connector connects to an attachment device designed to attach the carrier to a motor vehicle.

In some embodiments, the two-wheeled cycle carrier is designed to be modular in construction, allowing a user to adjust the size and carrying capacity of the cycle carrier depending on the user's needs. Without limiting the scope of the invention, modular construction allows, for example, a user selectively to include either a single rail or a plurality of rails on the cycle carrier, enabling the cycle carrier to transport either a single two-wheeled cycle or a plurality of two-wheeled cycles. In some embodiments, a user is able selectively to construct a cycle carrier capable of transporting as many as 3 two-wheeled cycles. In some embodiments, a user is able selectively to construct a cycle carrier capable of transporting as many as 4 two-wheeled cycles. In some embodiments, a user is able selectively to construct a modular cycle carrier capable of transporting as many as 5 two-wheeled cycles.

The modular construction of many embodiments of the present invention also allows a user to select different parts of the two-wheeled cycle carrier that have different dimensions. The modular construction of many embodiments of the present invention permits a user to adjust the locations of various parts of the two-wheeled cycle carrier to fit the user's needs.

Modular design enables a user, for example, to adjust the locations of the upper and lower first engagement mechanisms depending on the size of the two-wheeled cycle to be transported. A user can similarly select, exchange, or replace various other parts of cycle carrier to accommodate his or her needs. For example, a user can selectively include various rails and/or loading ramps having different dimensions in order to accommodate two-wheeled cycles having different dimensions and/or weights.

In the embodiment shown in FIG. 1, a carrier for one or more two-wheeled cycles is depicted. The cycle carrier 100 includes a loading ramp 104 that can be extended, telescoped, and/or folded down so that the distal end of the loading ramp 104 reaches to substantially ground level. The loading ramp 104 can include any suitable material such as, for example, plastic, thermoplastic, metal, or wood. The loading ramp 104 connects to the rail 116 at the rail end of the loading ramp 104. Loading ramp 104 and/or rail 116 may optionally include an elongate wheel pathway 117 extending lengthwise along the length of the loading ramp 104.

Wheel pathway 117 may be square-cut, having 90° angles between the walls and floor of the wheel pathway 117. In other embodiments, wheel pathway 117 may be inwardly beveled at an angle that is not a 90° angle. The rail 116 is supported by a support beam 124 extending upwardly and attaching the rail 116 near the distal end of the rail 116. Support beam 124 includes both a rail end, which connects to the rail 116, as well as a rail-connector end, which connects to a rail connector 140. The rail connector 140 connects to the rail 116 toward the proximal end of the rail 116. The rail connector 140 can optionally be configured to connect with a tow hitch connector 120, which is configured to attach to the trailer hitch or towing ball of a motor vehicle.

Rail connector 140 can also be configured to connect directly to a trailer hitch, towing ball, or similar attachment point of a motor vehicle. Rail connector 140 can optionally include an A-frame coupler, a straight coupler, an adjustable coupler, a gooseneck coupler, or any other trailer coupler or other means for connecting the cycle carrier 100 to a motor vehicle, as one of ordinary skill in the art would understand.

The cycle carrier 100 may optionally include a roof grip 132 which is configured to rest on or attach to the roof of a motor vehicle and which provides additional support and stability to the cycle carrier 100. In some embodiments, the roof grip 132 may optionally extend outwards from the distal end of the rail 116 to rest on or attach to the roof a motor vehicle. In other embodiments, the roof grip 132 extends outwards from the distal end of the rail 116 to rest or attach to a roof rack of the motor vehicle. In still other embodiments, the roof grip 132 extends outwards from the distal end of the rail 116 to rest on or attach to an opening in a motor vehicle such as, for example, an open or partially open window. In some embodiments, the roof grip 132 is the primary load-bearing structure for connecting the cycle carrier to the motor vehicle, and various connecting features and techniques may be used to connect the roof grip 132 to the motor vehicle, as one of ordinary skill in the art would understand.

In addition to or in lieu of wheel pathway 117, cycle carrier 100 may include lower wheel supports 108a and upper wheel supports 108b, which provide support for the wheels of the two-wheeled cycle and prevent lateral movement of the two-wheeled cycle during loading, unloading, and transport. The lower wheel supports 108a and upper wheel supports 108b are disposed toward the sides of the rail 116 and extend upwards past the top surface of the rail 116. The lower wheel supports 108a and upper wheel supports 108b are located near the proximal and distal ends of the rail 116, respectively.

At or near the proximal end portion of the rail 116, a lower initial engagement mechanism 112a is attached to the rail 116. Near the distal end of the rail 116, an upper initial engagement mechanism 112b is attached to the rail 116. Both the upper initial engagement mechanism 112 and the lower initial engagement mechanism 112b are configured to selectively and removably attach to the wheels of a two-wheeled cycle, thereby holding the wheels in place. The lower wheel supports 108a and upper wheel supports 108b are located near the lower initial engagement mechanism 112a and the upper initial engagement mechanism 112b, respectively.

Figure 2:
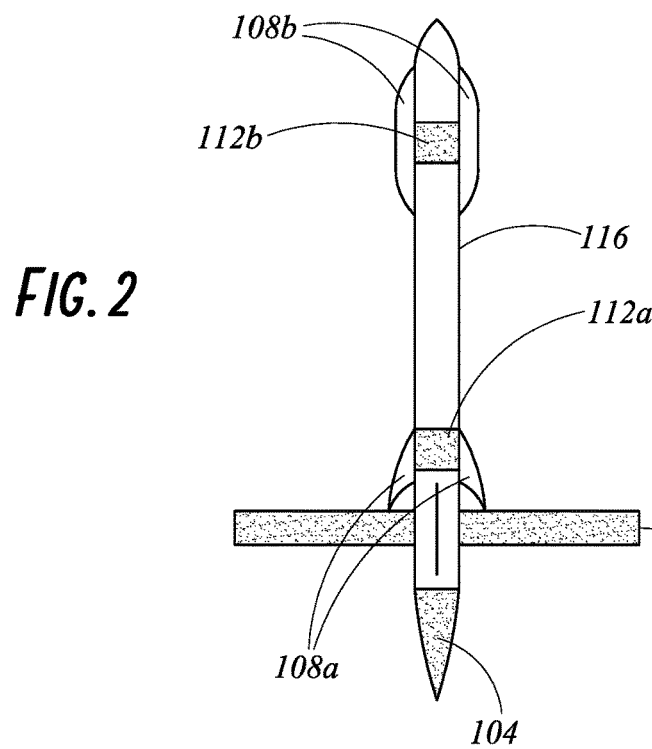
FIG. 2 is a frontal view of the cycle carrier shown in FIG. 1.

FIG. 2 depicts a cycle carrier 100 that includes a base member 136 configurable optionally to accommodate multiple rail connectors 140. Base member 136 could be used to attach a plurality of rail connectors 140 to which additional rails 116 can be connected if desired. An embodiment of this type would permit the loading, unloading, and/or transporting of multiple two-wheeled cycles at the same time.

FIG. 3 depicts two possible embodiments of an initial engagement mechanism 112. In the embodiment shown in FIG. 3A, the initial engagement mechanism 112 includes an engagement arm 113. The engagement arm 113 has the appearance of a mechanical arm and may be straight, curved, or angular in shape. The engagement arm 113 may be rotated around an axis point 114.

The axis point 114 permits engagement arm 113 to rotate in a single plane and permits the engagement arm 113 selectively to occupy a position that is substantially parallel to the rail 116 when the engagement arm 113 is in the unlocked position and perpendicular to the rail 116 when engagement arm 113 in the locked position. The engagement arm 113 may optionally be mechanically predisposed to rest in the locked position. For example, the engagement arm 113 may be spring-loaded, hydraulically loaded, or pneumatically loaded to rest in the locked position. Other techniques of predisposing the engagement arm 113 may also be used, as one of ordinary skill in the art would understand. The engagement arm 113 may also optionally be mechanically predisposed to rest in the unlocked position using similar means.

Figure 3A:
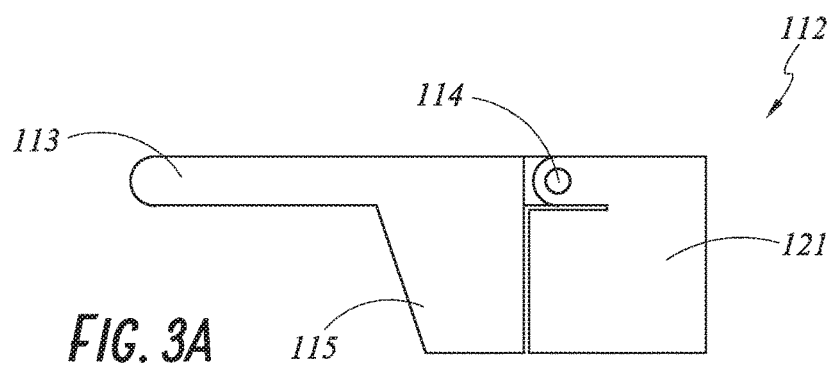
FIG. 3A depicts a top view of one possible embodiment of an initial engagement mechanism.
Figure 3B:
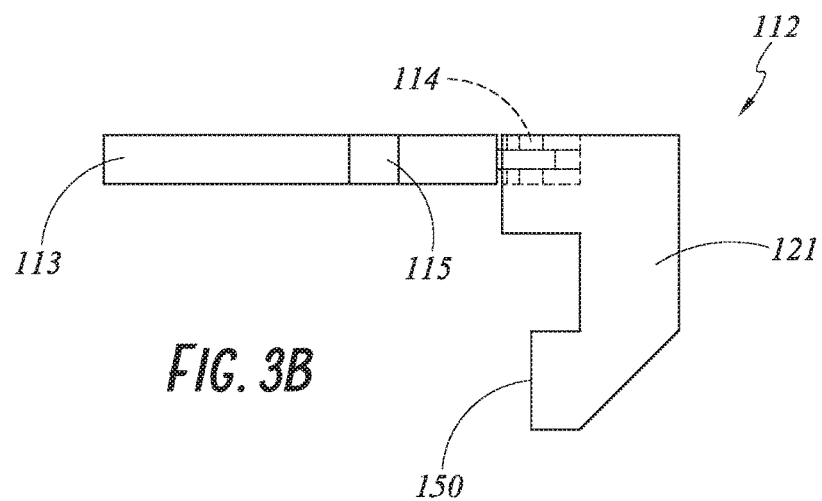
FIG. 3B depicts a frontal view of the embodiment of FIG. 3A.
Figure 3C:
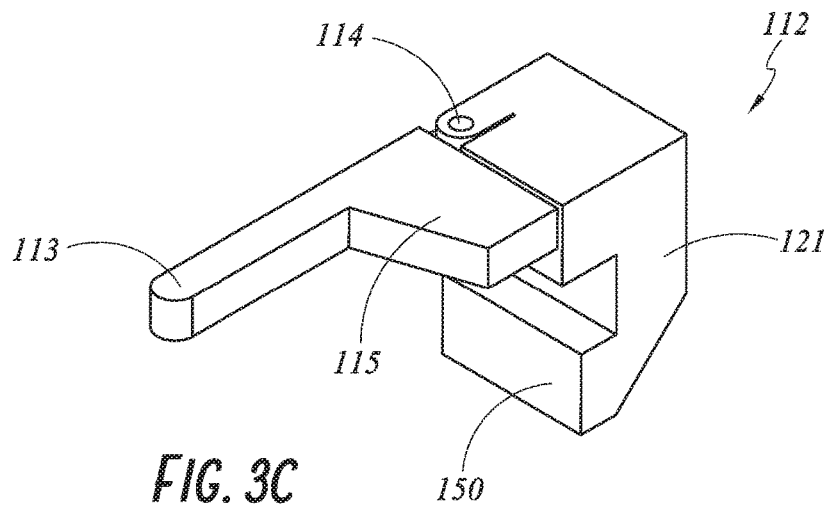
FIG. 3C depicts an isometric view of the embodiment of FIGS. 3A and 3B.

The initial engagement mechanism 112 optionally includes a stopper 115, which prevents the engagement arm 113 from rotating backwards past a predetermined angle. In some embodiments, the stopper 115 is directly connected to the engagement arm 113 near the axis point 114. In other embodiments, the stopper 115 is an integrally formed portion of the engagement arm 113 that extends outward close to the axis point 114, preventing backward rotation of the engagement arm 113, as is depicted in FIGS. 3A-3C. Whether attached to the engagement arm 113 or integrally formed as part of the engagement arm 113, the stopper 115 rotates around the axis point 114 along with the engagement arm 113 when the engagement arm 113 is selectively rotated.

In at least one embodiment, when a two-wheeled cycle is being loaded onto the cycle carrier 100, the user rolls the bicycle up the loading ramp 104 and onto the rail 116. The user rolls a first wheel of the two-wheeled cycle past the upper initial engagement mechanism 112 and a second wheel of the two-wheeled cycle past the lower initial engagement mechanism 112. In so doing, the user rolls the first wheel of the two-wheeled cycle past the engagement arm 113 of the upper initial engagement mechanism 112 and the second wheel past the engagement arm 113 of the lower initial engagement mechanism 112. This causes the engagement arm 113 of the engagement mechanisms 112 to be pushed forward into a position substantially parallel to the rail 116.

Once the wheels of the cycle have been pushed past the engagement arms 113 of the engagement mechanisms 112, the user then manually pulls each engagement arm 113 back toward its original position substantially perpendicular to the length of the rail 116 until the movement of engagement arms 113 is arrested by the stopper 115. In some embodiments, the engagement arms 113 are predisposed toward a position substantially perpendicular to the length of the rail 116 and thus will automatically return to this position when the wheels of the two-wheeled cycle have moved sufficiently far past the engagement arms 113. For example, in some embodiments, the engagement arms 113 are spring-loaded, hydraulically loaded, or pneumatically loaded to be predisposed toward this position. The engagement arm 113 can be predisposed toward this position using any other technique, as one of skill in the art would understand.

In some embodiments, the user is not required to roll the wheels of the two-wheeled cycle entirely past the engagement arm 113 before returning the engagement arm 113 to its original position perpendicular to the length of the rail 116. In these embodiments, the engagement arm 113 can be used to reach through the spokes or hubs of the wheels of the two-wheeled cycle, thereby securing the two-wheeled cycle. In still other embodiments, the engagement arm 113 begins in a position substantially parallel to the length of the rail 116 prior to loading of the two-wheeled cycle. Once the two-wheeled cycle has been rolled to the desired location on the rail 116, the user moves the engagement arm 113 into a position substantially perpendicular to the length of the rail 116, thereby engaging the wheel of the two-wheeled cycle.

Figure 3D:
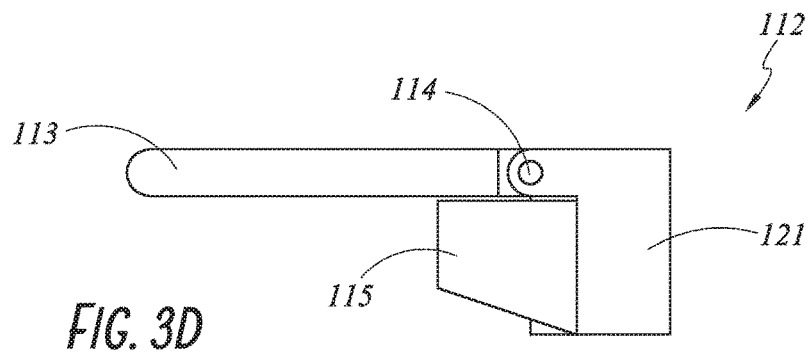
FIG. 3D depicts a top view of another embodiment of an initial engagement mechanism.
Figure 3E:
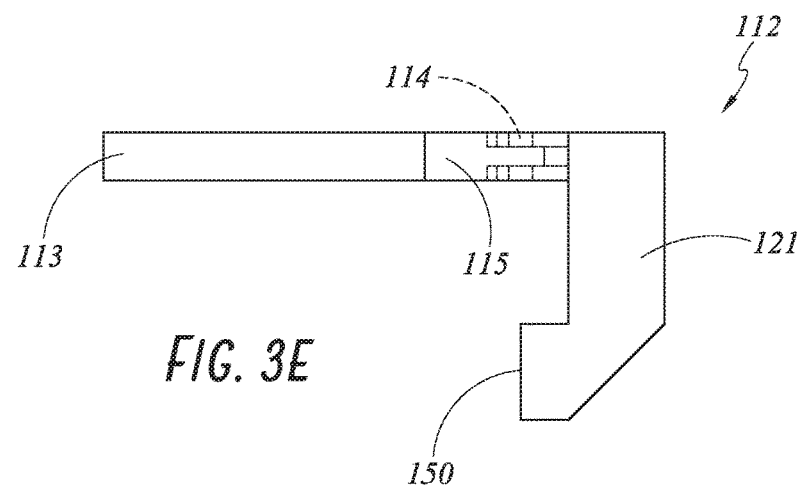
FIG. 3E depicts a frontal view of the embodiment of FIG. 3D.
Figure 3F:
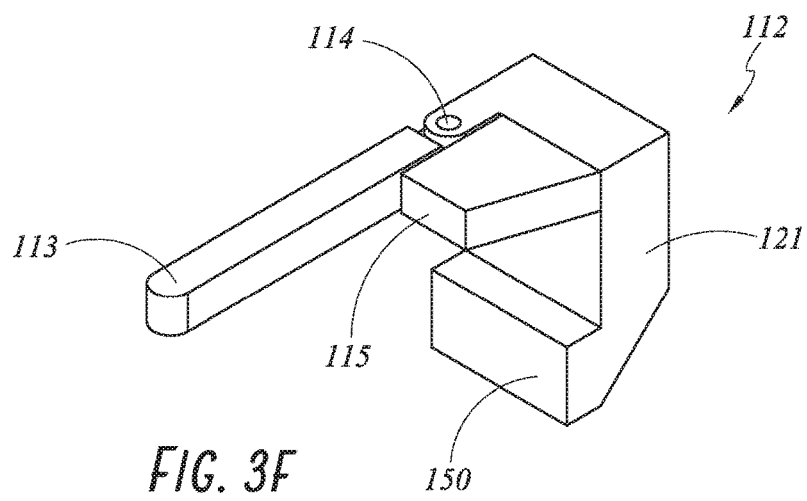
FIG. 3F depicts an isometric view of the embodiment of FIGS. 3D and 3E.

In some embodiments of the invention, as is shown in FIGS. 3A through 3F, the engagement arm 113 occupies a raised location and is suspended above the top surface of the rail 116, such that the engagement arm 113 does not touch the surface of the rail 116 when the two-wheeled cycle is rolled past the engagement arm 113. In at least one such embodiment, the raised engagement mechanism 112 is connected to the rail 116 at a rail attachment point 150. The engagement mechanism 112 can be suspended above the rail by a spacer 121. The spacer 121 can optionally be an elongate structure configured to hold the engagement mechanism 112 at a height at least several inches above the rail 116, as one of skill in the art would understand. The spacer 121 can also optionally be configured to hold the engagement mechanism 112 a shorter distance above the rail 116, as one of skill in the art would understand. In some embodiments, the stopper 115 is attached to top portion of the spacer 121 and near the axis point 114, as is shown in FIGS. 3D-3F. In these embodiments, the stopper 115 does not move when the engagement arm 113 is selectively rotated, but the stopper 115 still prevents the engagement arm 113 from rotating backwards past a predetermined angle.

In some embodiments, the engagement arm 113 and stopper 115 occupy locations on the top surface of the rail 116, so that the engagement arm 113 is pushed backwards onto or substantially onto the rail surface when the two-wheeled cycle is rolled past the engagement arm 113.

Figure 4:
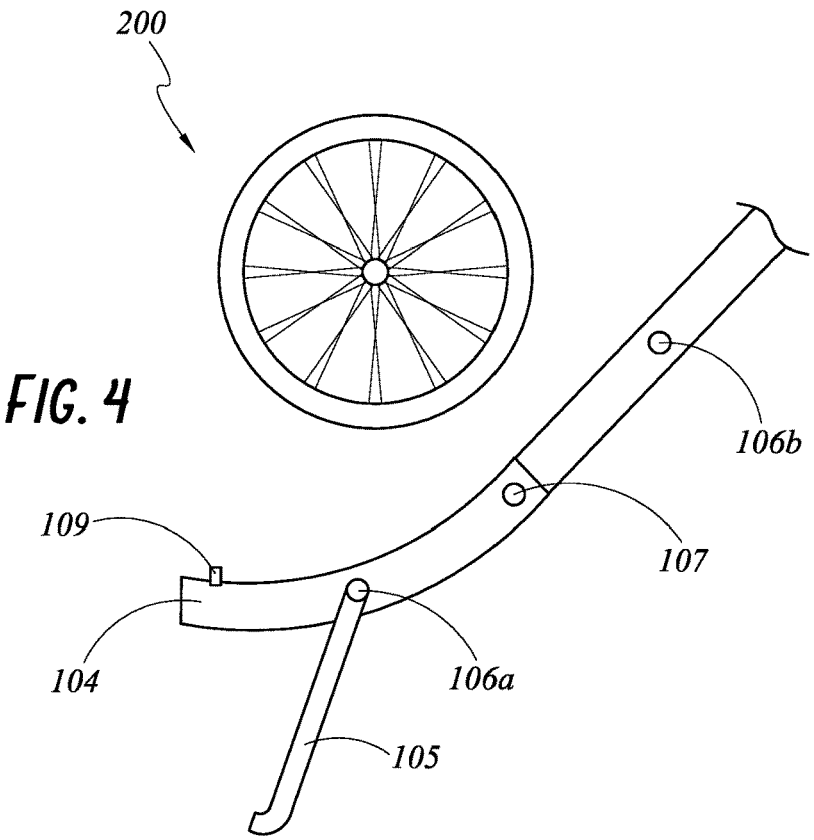
FIG. 4 depicts an embodiment of a final engagement mechanism in an open and unengaged position.
Figure 5:
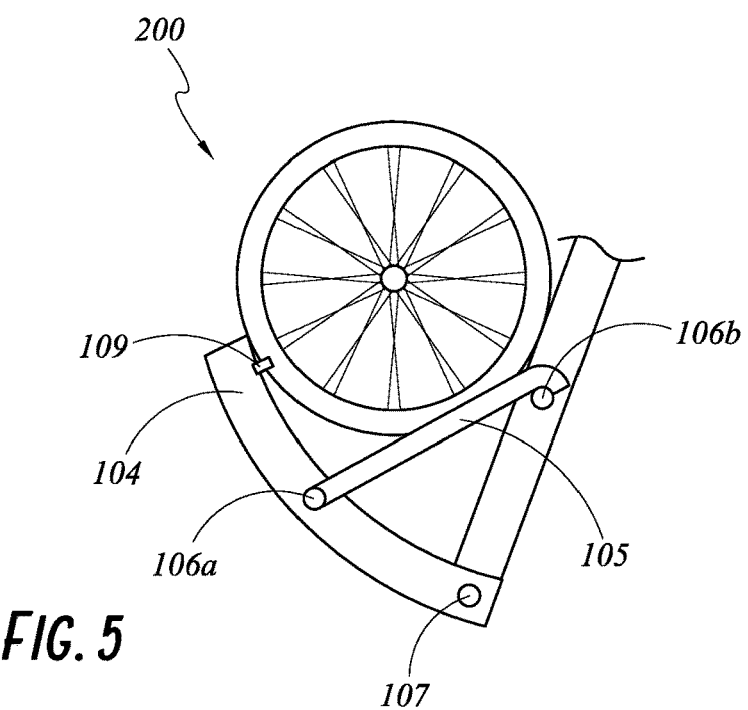
FIG. 5 depicts the final engagement mechanism embodiment of FIG. 4 in a closed and engaged position.

FIG. 4 shows one embodiment of a final engagement mechanism 200 that is in an open and unlocked position. In this embodiment of a final engagement mechanism 200, the loading ramp 104 can be folded up at the ramp junction 107. The ramp junction 107 is located where the loading ramp 104 connects to the rail 116. When the loading ramp 104 is folded up, it can then be used to secure the rear wheel of a two-wheeled cycle, as is depicted in FIG. 5. As is shown in FIG. 5, the final engagement mechanism 200 of some embodiments may be configured selectively to connect the loading ramp 104 and the rail 116 when the final engagement mechanism 200 is in a first configuration. The final engagement mechanism 200 may also be configured in another configuration not to connect the loading ramp 104 and the rail 116, thereby allowing deployment of the loading ramp 104.

The loading ramp 104 may optionally include clamps 109 or other means for securely connecting the loading ramp 104 to the wheel of a two-wheeled cycle. In some embodiments, the final engagement mechanism 200 includes a fastening latch 105 which can be used securely to connect the loading ramp 104 to the rail 116. The Fastening latch 105 can include a latch or another type of mechanical fastening device, such as, for example, a fastening device capable of selectively and releasingly attaching the loading ramp 104 to the rail 116, as one of ordinary skill in the art would understand.

In at least one preferred embodiment, fastening latch 105 is a latch that is configured to rotate freely around a fastener pivot 106a. In the embodiment shown, the fastener pivot 106a is located on the loading ramp 104. Fastening latch 105 can selectively be coupled to a connection member 106b located on the rail 116. In some embodiments the connection member 106b could include a raised post. In other embodiments, the connection member 106b could include a nub, protrusion, bolt, staple, eyelet, catch, chain, or another type of mechanical connection receiver as one of ordinary skill in the art would understand.

As one of skill in the art would understand, fastener pivot 106a can be located on the rail 116, and the connection member 106b can be located on the loading ramp 104. In such an embodiment, fastening latch 105 can include a latch or other mechanical fastening device configured selectively to be coupled to the connection member 106b on the loading ramp 104. When fastening latch 105 is attached to the connection member 106b, the loading ramp 104 and the rail 116 sit at angle less than 90° relative to each other, thereby partially enclosing and securing the rear wheel of the two-wheeled cycle. The rear wheel of the two-wheeled cycle can optionally be further secured using clamps 109 or other means for securely connecting the wheel to the cycle carrier 100. The clamps 109 can optionally be attached to either the loading ramp 104 (as shown in FIGS. 4-5) and/or can optionally be attached to the ramp 116.

Figure 6:
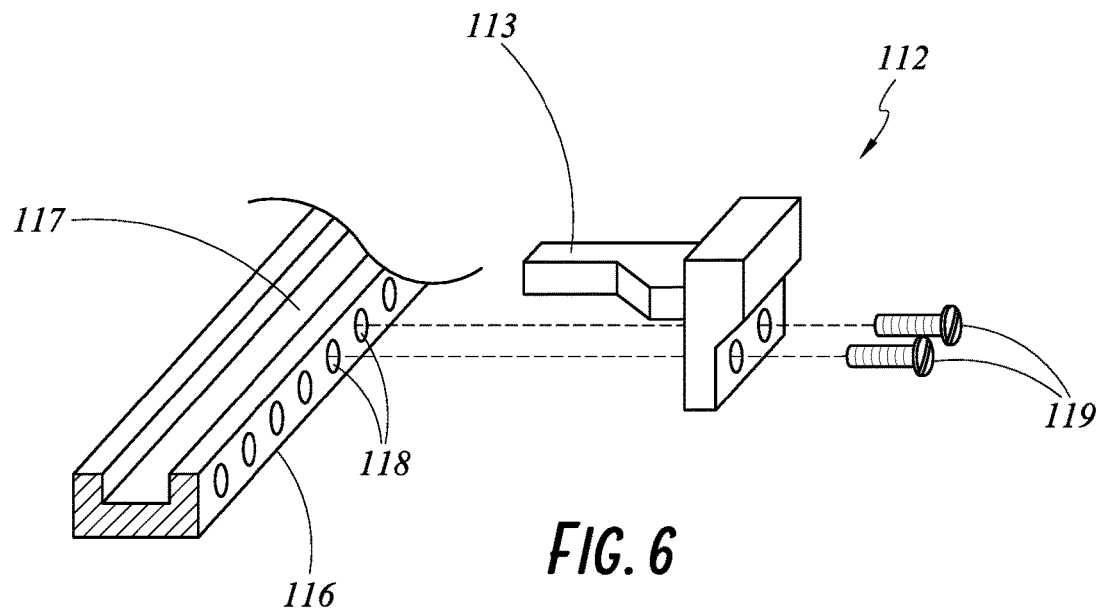
FIG. 6 is an isometric side view of one embodiment of a modular rail having a modular initial engagement mechanism.

FIG. 6 shows the rail 116 and initial engagement mechanism 112 of a modular cycle carrier 100. As is described herein, one of several advantages of this invention is that the cycle carrier 100 may be put together in a modular fashion, thus providing the user with enhanced flexibility and allowing the cycle carrier 100 to fit the transportation needs of the user. One or more fasteners 119 can be used to attach the initial engagement mechanism 112 to the rail 116.

The fasteners 119 can include, for example, screws or rivets that connect to the rail 116 via one or more holes 118 located on the side of the rail 116. The one or more holes 118 can include a series of holes lining the side of the rail 116. A series of holes 118 lining the rail 116 provides extra flexibility and modularity for the user in that they can allow the user to adjust the locations of both the upper and lower first engagement mechanisms 112a-b. By adjusting the location of the upper and lower first engagement mechanisms 112a-b, the user can adjust the cycle carrier to hold two-wheeled cycles of varying dimensions and sizes.

Figure 7:
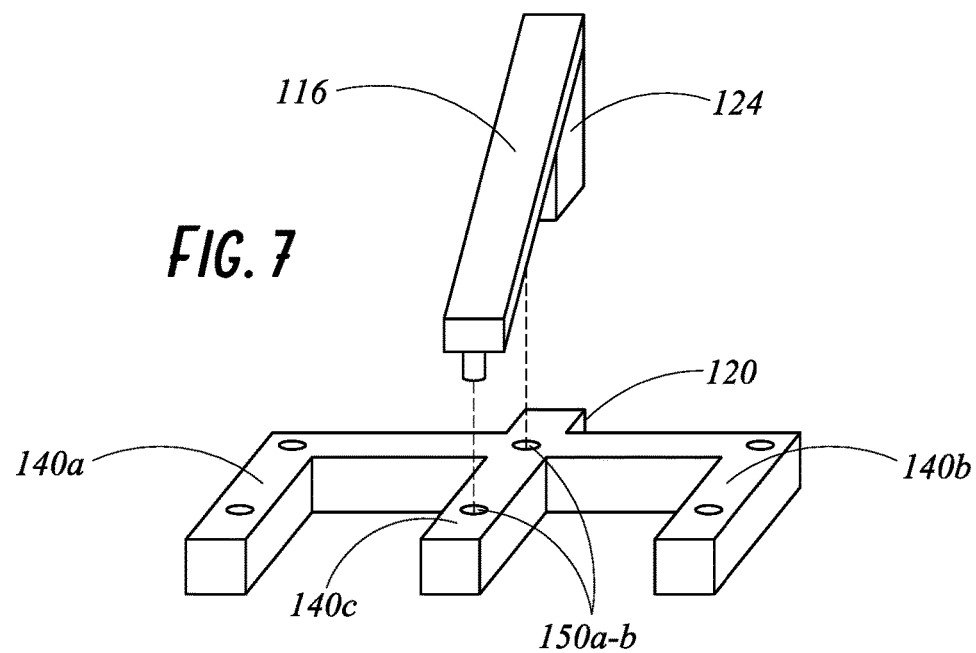
FIG. 7 is an isometric top view of portions of one embodiment of a modular two-wheel cycle carrier.

FIG. 7 shows additional features of a modular cycle carrier 100. In at least one embodiment, base member 136 is configured to attach to one or more additional rail connectors 140a, 140b which can be used support additional rails 116. Additional rails 116 can be used to load, unload, and/or transport additional two-wheeled cycles in accordance with the needs of the user. In this modular design, the rail 116 and support beam 124 attach to the rail connectors 140 via connection points 150a and 150b, respectively. Support beam 124 and ramp 116 are connected to the rail connectors 140 via fasteners 119a, which can include, for example, screws or rivets.

Reference throughout this specification to "some embodiments," "certain embodiments," or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Although the inventions presented herein have been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. Thus it is intended that the scope of the inventions herein disclosed should not be limited by the particular embodiments described above.

What is claimed is:

1. An apparatus for transporting one or more two-wheeled cycles comprising:
   a rail connector;
   an elongate rail connected to the rail connector, the rail comprising:
      a pathway for the wheels of a two-wheeled cycle;
      a proximal end configured to attach to the rail connector; and
      a distal end opposite the proximal end;
      wherein a length of the rail between the proximal end and the distal end of the rail is selected such that the rail is configured to touch a first wheel and a second wheel of a two-wheeled cycle;
   a loading ramp connected to the proximal end of the rail, the loading ramp being selectively deployable to a position to permit a user to roll the two-wheeled cycle up the loading ramp and onto the rail;
   an upper initial engagement mechanism, the upper initial engagement mechanism comprising a first engagement arm selectively deployable to secure a first wheel of the two-wheeled cycle; and a lower initial engagement mechanism, the lower initial engagement mechanism comprising a second engagement arm selectively deployable to secure a second wheel of the two-wheeled cycle;

wherein the loading ramp is configured to operate as a final engagement mechanism, wherein the final engagement mechanism provides, when engaged, sufficient stability to the two-wheeled cycle to keep the two-wheeled cycle secured to the apparatus during transportation, wherein when the first wheel and the second wheel are engaged with the upper and lower initial engagement mechanisms respectively, the loading ramp is capable of pivoting upwards to be in contact with the two-wheeled cycle;

wherein the upper initial engagement mechanism and the lower initial engagement mechanism, when selectively deployed to secure the first and second wheels of the two-wheeled cycle, respectively, provide sufficient stability to the two-wheeled cycle to keep the two-wheeled cycle stationary on the apparatus during loading and/or unloading of the two-wheeled cycle.

2. The apparatus of claim 1, further comprising a means for connecting to a tow hitch of a motor vehicle.

3. The apparatus of claim 1, further comprising a roof grip extending from the distal end of the rail and configured to rest on or attach to a roof or body of a motor vehicle.

4. The apparatus of claim 1, further comprising a roof grip extending from the distal end of the rail and configured to rest on or attach to a roof rack of a motor vehicle.

5. The apparatus of claim 1, wherein the engagement arm of the upper initial engagement mechanism or the lower initial engagement mechanism is predisposed to rest in a position in which the engagement arm is selectively deployed to secure the first wheel or the second wheel of the two-wheeled cycle.

6. The apparatus of claim 1, wherein the loading ramp is configured to operate as the final engagement mechanism by pivoting the loading ramp upwards at a junction point between the loading ramp and the rail, thereby securing in place the second wheel of the two-wheel cycle.

7. The apparatus of claim 6, wherein one or more clamps are provided on at least one of the rail or the loading ramp to aid in securing the second wheel or the first wheel of the two-wheeled cycle.

8. The apparatus of claim 1, wherein the apparatus is configured to attach to a motor vehicle.

9. The apparatus of claim 1, wherein at least one of the rail connector, the rail, the loading ramp, the upper initial engagement mechanism, the lower initial engagement mechanism, or the final engagement mechanism is of modular design.

10. The apparatus of claim 9, wherein at least one of the rail connector, the rail, the loading ramp, the upper initial engagement mechanism, the lower initial engagement mechanism, or the final engagement mechanism is interchangeable depending on the needs of a user.

11. A method of using a two-wheeled cycle carrier to load a two-wheeled cycle, the method comprising:

selectively lowering a loading ramp to a position to permit a user to roll the two-wheeled cycle up the loading ramp and onto a rail;

rolling the two-wheeled cycle from a first location up the loading ramp;

rolling the two-wheeled cycle onto the rail a sufficient distance to permit an upper initial engagement mechanism and a lower initial engagement mechanism to a engage a first wheel of the two-wheeled cycle and a second wheel of the two-wheeled cycle;

engaging the upper initial engagement mechanism to secure the first wheel of the two-wheeled cycle;

engaging the lower initial engagement mechanism to secure the second wheel of the two-wheeled cycle;

wherein engagement of the upper initial engagement mechanism and the lower initial engagement mechanism provides sufficient stability to permit the user to let go of the two-wheeled cycle without the two-wheeled cycle falling off of the apparatus when the apparatus is not being transported; and pivoting the loading ramp to operate as a final engagement mechanism, the final engagement mechanism providing sufficient stability to the two-wheeled cycle to keep the two-wheeled cycle securely in place on the apparatus during transportation wherein when the first wheel and the second wheel are engaged with the upper and lower initial engagement mechanisms respectively, the loading ramp is capable of pivoting upwards to be in contact with the two-wheeled cycle.

12. The method of claim 11, wherein the user loads multiple two-wheeled cycles.

13. The method of claim 11, further comprising selecting at least one of the rails, the loading ramp, the upper initial engagement mechanism, the lower initial engagement mechanism, or the final engagement mechanism to be included in the two-wheeled cycle carrier based on the needs of the user.

14. The method of claim 11, further comprising providing a motor vehicle to which the two-wheeled cycle carrier is connected.

15. The method of claim 14, further comprising transporting the two-wheeled cycle carrier to a second location using the motor vehicle.

16. The method of claim 15, further comprising unloading the two-wheeled cycle from the two-wheeled cycle carrier at the second location.

* * * * *